May 3, 1927.

H. G. APPELIAN ET AL 1,626,775

FRAME FOR BICYCLES

Filed Nov. 28, 1925

INVENTORS:
HENRI GERARD APPELIAN
JULES JOSEPH VAN HOREN

BY:

THEIR ATTORNEY.

Patented May 3, 1927.

1,626,775

UNITED STATES PATENT OFFICE.

HENRI GERARD APPELIAN AND JULES JOSEPH VANHOREN, OF LONDON, ENGLAND. ASSIGNORS OF ONE-HALF TO ROBERT JAMES WALKER, OF LEICESTER, ENGLAND.

FRAME FOR BICYCLES.

Application filed November 28, 1925, Serial No. 71,997, and in Great Britain December 3, 1924.

This invention relates to a new or improved frame for a bicycle. The object of the invention is to provide a strong and simple frame construction, and one in which the adjustment of the saddle position to suit riders of different ages and statures may be very easily and rapidly effected.

According to the invention a frame for a bicycle is provided, built up of a number of members, the positions of some of which with regard to others may be varied in such a manner as to effect the adjustment of the position of the saddle up or down and/or backwards or forwards.

In the preferred construction the frame comprises five substantially straight members connected together to form two triangles, an upper and a lower, with one common side. The two independent sides of the upper triangle support the saddle and they are connected together and to the member common to both triangles in such a manner as to be adjustable in position both relatively to one another and to the common member.

The invention is illustrated by way of example in the accompanying drawing in which—

Figure 1:
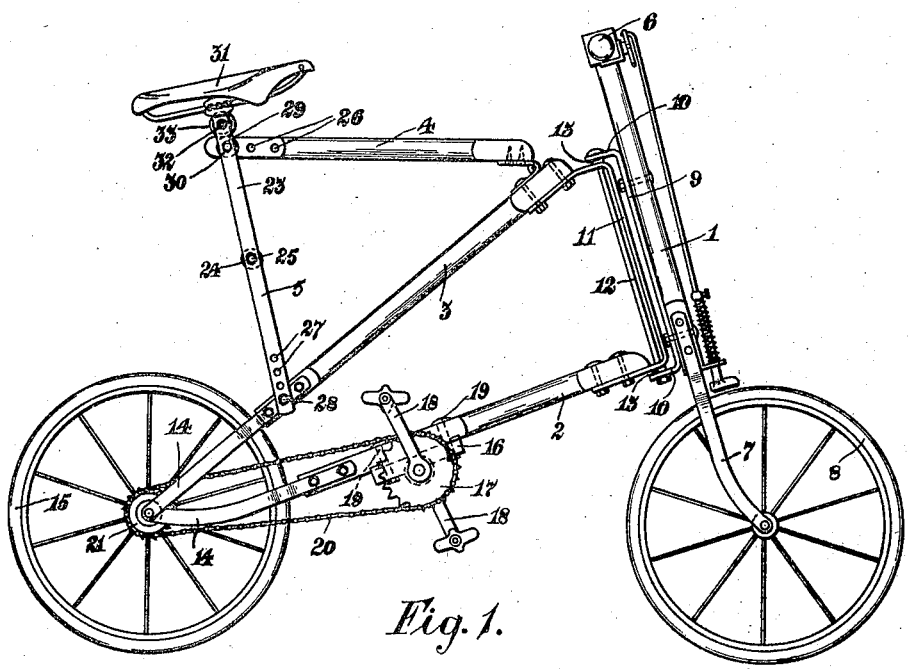
Figure 2:
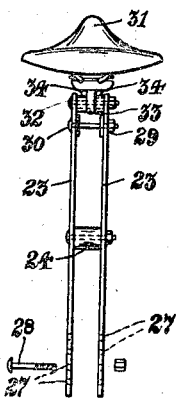

Fig. 1 is a view in elevation of a complete bicycle embodying the invention, and Fig. 2 is a view, from the rear, of the adjustable rear down stay of the frame.

Referring to Fig. 1, the frame of the cycle is formed of five substantially straight members 1, 2, 3, 4 and 5 arranged to form two triangles, a lower 1, 2, 3, and an upper 3, 4, 5, the member 3 being common to both triangles. The member 1 is preferably a wooden rod having a cross bar 6 at its upper end to form a handle bar and two metal strips 7 bolted or otherwise secured at its lower end to form the fork for the front wheel 8. On the rear face of member 1 is fixed a metal plate 9 having a lug 10 at each end, and between these lugs 10 is arranged a metal bracket 11 fixed to and spacing the forward ends of the members 2 and 3 of the lower triangle.

A stiff metal rod 12 is passed through apertures in the lugs 10 and the ends of the bracket 11 so as to form a pivot for member 1 and the front wheel when the handle bar 6 is turned for steering. Spacing washers 13 are preferably provided to give ease of steering without loss of rigidity.

The members 2 and 3 are also in the form of wooden rods each provided with metal strips 14 bolted to the rods and forming forks for the rear wheel 15. At a suitable point on member 2 is secured a bearing bracket 16 for the chain gear wheel 17 and pedal cranks 18, and this bracket is preferably provided with elongated slots for the passage of the bolts 19 with which it is secured to the member 2 to permit adjustment of the transmission chain 20 leading to the sprocket 21 at the rear wheel 15.

The member 4 of the upper triangle forms the top bar of the cycle frame and is secured at its forward end to the member 3 by means of a strong hinge 22 for a purpose to be described. The rearward end is provided with a series of spaced holes 26.

Member 5 forms the rear down stay of the frame and comprises two strips 23 of metal (Fig. 2) arranged parallel to one another, spaced by a block 24 and connected together by a bolt 25 passed through the block 24. These strips 23 are furnished at the lower ends with spaced holes 27 arranged opposite one another and adapted to receive a bolt 28 passed through a hole in member 3 to connect members 3 and 5. At the upper end member 5 is furnished with a hole 29 for the passage of a bolt 30 which passes through one of the series of holes 26 in member 4 whereby members 4 and 5 are connected together.

The saddle 31 is carried at the upper end of member 5, being carried by a bolt 32 passed through holes in the member 5 and through a ring 33 rigidly fixed to the underside of the saddle. Packing washers 34 are provided between the ends of the plates 23 and the ring 33 so that the latter may be clamped firmly in position by means of bolts 30.

To raise or lower the saddle 31, bolt 30 is slackened and bolt 28 removed member 5 is raised or lowered until the desired holes of the series 27 are opposite the hole in member 3, the member 4 meanwhile turning about the hinge 22, and bolt 28 is then reinserted and tightened together with bolt 30. If it is desired to move the saddle towards or away from the handle bar 6, bolt 28 is slackened and bolt 30 removed. Member 5 is moved about the bolt 28 as a pivot until the hole 29 registers with the required hole of the series 26 in member 4. Bolt 30 is then re-inserted and tightened up together with bolt 28. It will of course be understood that adjustment of the saddle position, both vertically and longitudinally, can be effected simultaneously.

Should it be desirable to change the angle which the saddle 31 makes with the horizontal this can be effected by loosening bolt 32, when the saddle 31, through ring 33, can be turned about bolt 32 until the desired angle is obtained. The saddle is then clamped in position by tightening bolt 32.

We claim:

1. A bicycle comprising wheels, a saddle, steering means and a supporting frame, said frame embodying a main frame member, auxiliary frame members beneath said main member adapted together with said main member to support the wheels and the steering means, a pair of saddle supporting frame members above said main frame member, said saddle supporting members being interconnected and also each separately connected with the main member, the connections between said saddle supporting members and between said saddle supporting members and the main member being adjustable in conjunction with one another to vary the position of the saddle with regard to the handle bars and with regard to the ground.

2. A bicycle comprising wheels, a saddle, a handle bar, a frame supporting said wheels, saddle and handle bar, said frame comprising members arranged to form two triangles, two of the sides of one of said triangles being movable with regard to one another to vary the position of the saddle both with regard to the handle bar and with regard to the ground.

3. A bicycle comprising wheels, a saddle, a handle bar, a frame supporting said wheels, saddle and handle bar, said frame comprising members arranged to form two triangles, an upper and a lower, with one common side, two of the sides of one of said triangles being movable with regard to one another to vary the position of the saddle both with regard to the handle bar and with regard to the ground.

4. A bicycle comprising wheels, a saddle, a handle bar, a frame supporting said wheels, saddle and handle bar, said frame comprising members arranged to form two triangles, an upper and a lower, with one common side, two of the sides of the upper triangle being adapted to form the cross bar and the rear down stay of the cycle frame and both said sides being movable so as to vary the position of the saddle both with regard to the handle bar and with regard to the ground.

5. A bicycle as claimed in claim 5, comprising a multi-apertured cross bar hinged at its forward end to the frame member common to the two triangles forming the frame, a multi-apertured rear down stay, and bolts adapted to pass through the apertured members to connect them with one another and with the frame member common to both triangles.

6. A bicycle as claimed in claim 5 comprising a multi-apertured cross bar hinged at its forward end to the frame member common to the two triangles forming the frame, a rear down stay formed of two multi-apertured metal bars and spacing means therefor, and bolts adapted to pass through the apertured members to connect them with one another and with the frame member common to both triangles.

In testimony whereof, we have signed our names to this specification at London, England, this 13th day of November, 1925.

HENRI GERARD APPELIAN.
JULES JOSEPH VANHOREN.